United States Patent
Triller

(10) Patent No.: US 8,662,434 B2
(45) Date of Patent: Mar. 4, 2014

(54) FISHING REEL, ESPECIALLY FOR FLY FISHING

(76) Inventor: Wolfgang Triller, Mengkofen (DE)

( * ) Notice: Subject to any disclaimer, the term of this patent is extended or adjusted under 35 U.S.C. 154(b) by 0 days.

(21) Appl. No.: 13/390,634

(22) PCT Filed: Jul. 23, 2010

(86) PCT No.: PCT/DE2010/000863
§ 371 (c)(1),
(2), (4) Date: Apr. 5, 2012

(87) PCT Pub. No.: WO2011/020453
PCT Pub. Date: Feb. 24, 2011

(65) Prior Publication Data
US 2012/0181365 A1    Jul. 19, 2012

(30) Foreign Application Priority Data

Aug. 17, 2009 (DE) .................. 10 2009 037 509
Dec. 4, 2009 (DE) .................. 10 2009 056 825

(51) Int. Cl.
*A01K 89/01* (2006.01)
(52) U.S. Cl.
USPC .......................................... 242/317; 242/322
(58) Field of Classification Search
USPC .......................................... 242/317–319, 322
See application file for complete search history.

(56) References Cited

U.S. PATENT DOCUMENTS

| 4,733,830 A * | 3/1988 | Hollander ............. 242/292 |
| 5,078,334 A * | 1/1992 | Zanon ................. 242/322 |
| 5,120,003 A * | 6/1992 | Sacconi ............... 242/317 |
| 5,230,484 A * | 7/1993 | Stevenson ............. 242/227 |
| 5,573,193 A * | 11/1996 | Bernard et al. ......... 242/319 |
| 5,755,391 A * | 5/1998 | Sacconi ............... 242/312 |
| 6,467,712 B1 * | 10/2002 | Cribb ................. 242/322 |
| 6,712,300 B2 * | 3/2004 | Carlebach et al. ....... 242/318 |
| 2003/0136868 A1 * | 7/2003 | Carlebach et al. ....... 242/322 |

FOREIGN PATENT DOCUMENTS

| DE | 80 25 268 U1 | 2/1981 |
| EP | 1 745 696 A1 | 1/2007 |
| GB | 2183431 A | 6/1987 |
| NL | 1 002 263 C2 | 8/1997 |
| WO | 03/061372 A2 | 7/2003 |
| WO | 2009/093062 A1 | 7/2009 |

OTHER PUBLICATIONS

International Search Report and Written Opinion under date of mailing of Nov. 23, 2010 in connection with PCT/DE2010/000863.

* cited by examiner

*Primary Examiner* — Emmanuel M Marcelo
(74) *Attorney, Agent, or Firm* — Quarles & Brady LLP

(57) ABSTRACT

A fishing reel, especially for fly fishing, comprising a spool (2) the annular or tubular hub part (3) (core) of which is removably mounted on a shaft (4), characterized in that said removable shaft is axially located in the hub part by means of at least one releasable detent connection and is non-rotatably retained in the body of the spool by means of at least one positive connection.

14 Claims, 1 Drawing Sheet

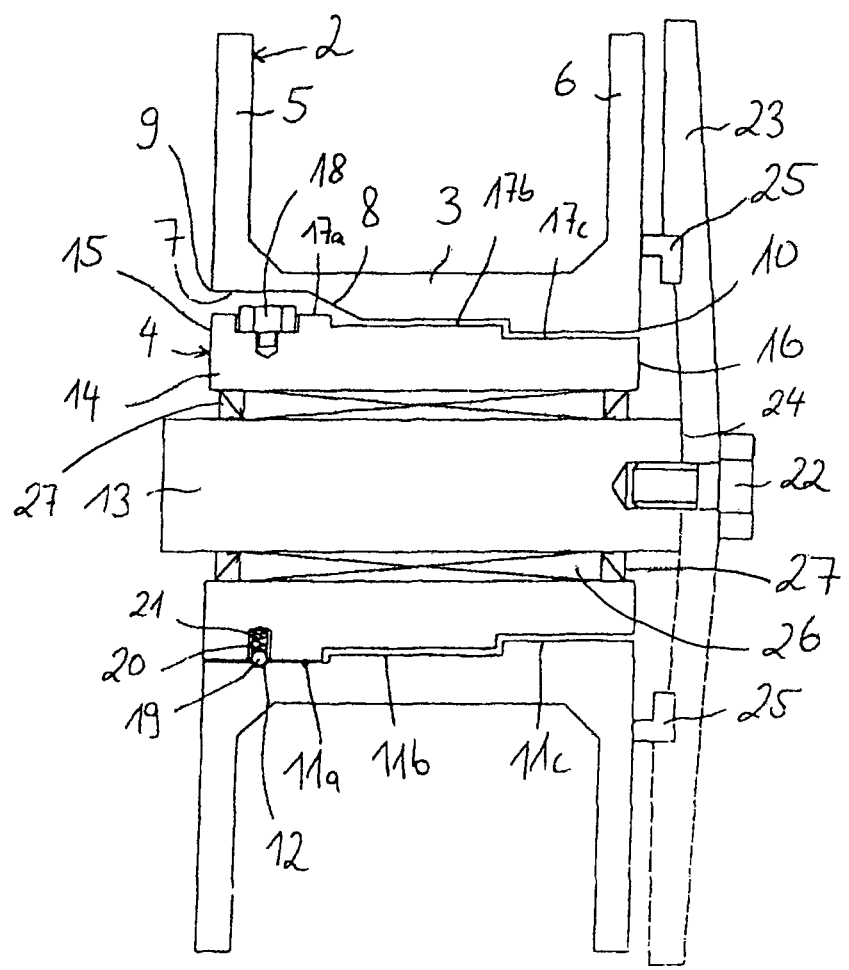

FISHING REEL, ESPECIALLY FOR FLY FISHING

CROSS-REFERENCE TO RELATED APPLICATIONS

This application represents the national stage entry of PCT International Application No. PCT/DE2010/000863 filed Jul. 23, 2010 which claims the benefit of German Patent Application 10 2009 037 509.0 filed Aug. 17, 2009 and German Patent Application 10 2009 056 825.5 filed Dec. 4, 2009, all of which are hereby incorporated herein by reference for all purposes.

STATEMENT REGARDING FEDERALLY SPONSORED RESEARCH OR DEVELOPMENT

Not applicable.

FIELD OF THE INVENTION

The present invention relates to a fishing reel, especially for fly fishing, comprising a spool the annular or tubular hub part (core) of which is removably mounted on a shaft.

BACKGROUND OF THE INVENTION

It is often needed with fishing reels that the spools for receiving the line are designed replaceable for diverse modes of operation. With known reels, particularly of the special type, involving the dual-mode system either costly replacement spools have to be used or a body of the spool having a very large inner diameter (large core spools) is needed so that the spool can be slipped over the mechanical assembly. Separating these replacement spools from the mechanical assembly is usually highly complicated and/or only possible with some special tool.

The present invention is based on the object of providing a fishing reel which does away with the drawbacks associated with prior art reels. The present invention is especially based on the object of providing a fishing reel which now makes it possible to reduce the costs of replacement spools whilst making use of a small body of the spool.

This object is achieved by a fishing reel of the aforementioned kind characterized in that said removable shaft is axially located in the hub part by means of at least one releasable detent connection and is non-rotatably retained in the body of the spool by means of at least one positive connection.

The reel in accordance with the invention now facilitates removing the spool simply by removing its supporting shaft. In one preferred embodiment of the reel in accordance with the invention the shaft comprises at least one resilient pretensioned detent, preferably at least one detent mount being provided in the inner circumferential surface of the hub part of the body of the spool to snap locate the detent.

Preferably at least one detent is a ball snap loaded in its guide by a compression spring. Such resilient pretensioned detents now makes it possible to change the spool greatly facilitated since the force needed to withdraw the spool from the shaft or to mount the spool on the shaft (until it snaps into place) is now a minimum.

To advantage the at least one detent mount is a groove, preferably an annular groove. Machining such a groove in the inner circumference of the core is simple when manufacturing the body of the spool. In addition to this such a groove has the advantage that the detents, particularly pressurized balls permit snap location anywhere in the groove.

Instead of a detent as described above an O-ring of a resilient material (for example rubber) may be provided.

In another preferred embodiment of the reel in accordance with the invention the shaft comprises at least one slave element, preferably a key, tang or pin engaging a depression, preferably a groove running in the longitudinal direction of the hub part in the inner circumferential surface of the reel mechanical assembly for a positive connection with the body of the spool. The slave element may be, for example, releasably connected to the shaft (e.g. screw-threaded). The depression in cooperation with the slave element preferably extends to an outer end of the inner circumferential surface of the hub part up to roughly the middle of the hub part. The width of the depression is dimensioned so that the slave element has a minimum or even zero play therein.

Preferably the hub part has at one end a larger inner diameter than at the other end, the inner circumference of the hub part being preferably configured stepped. As a rule the inner diameter of the hub part is stepped from one end to the other by at least one, preferably three steps. The inner diameter may also be tapered. Reducing the inner diameter from one end to the other achieves, among other things, that the shaft can be inserted from one side of the hub part only since the outer diameter of the shaft at its widest location exceeds the inner diameter of the hub part and one of the two ends. There is thus never the risk of the shaft being inserted into the body of the spool the "wrong way round".

To advantage the shaft comprises a housing accommodating the reel mechanical assembly and on which preferably the male detent, slave element for the detent or positive connection with the body of the spool are arranged. The shaft or its housing must not necessarily be configured fully enclosed, i.e. the shaft or housing may be engineered skeletonized to save weight.

To advantage the shaft comprises at least one stabilizing ring, arranged for example substantially in the middle of the shaft. As a rule such a ring is engineered in one piece with the piece or housing of the shaft in serving to mount the body of the spool in preventing bending thereof, for instance, when paying in the line loaded (for example when playing a catch).

As a rule a handle is fitted to one end of the shaft for actuating the reel. The handle may be fitted replaceable to the shaft.

As a rule the shaft is releasably connected, preferably screw-threaded at one end with a spool housing which, as a rule, comprises a foot connecting the reel as a whole to the rod interconnected by the two elements. Engineering the shaft in releasable connection with the spool housing greatly facilitates fitting and removing the reel.

Preferably the spool comprises at the outer side of a spool wall a spring, arranged particularly at the outer side of the spool at which the shaft is connected to the spool housing. The cited spring defines the body of the spool relative to the rigid housing with excessive axial pressure so that the detents always return the body of the spool to the wanted axial position. It is this spring that greatly restricts the play of the spool in the structure as a whole so that detents remain in their detented position even with excessive axial pressure.

Preferably the shaft has a larger diameter in an inner portion than in the region of the end which is releasably connected to the spool housing which, as already indicated above, results in the advantage that the shaft can only be inserted from one side into the spool housing.

Further features of the invention read from the following description of preferred embodiments of the invention in conjunction with the drawing and sub-claims, it being understood that each of the features may be achieved by itself or in any combination with each other.

BRIEF DESCRIPTION OF THE DRAWINGS

In the drawing

FIG. 1 is a longitudinal section view of a fishing reel in accordance with the invention.

DETAILED DESCRIPTION OF THE EXAMPLE EMBODIMENTS

Referring now to FIG. 1 there is illustrated a longitudinal section view of a reel 1 in accordance with the invention including a spool 2 mounted removable from a shaft 4 by its hollow core 3. In this drawing the spool 2 is depicted without a line which when the spool is ready for use is wound around the core 3 of the spool. The spool 2 comprises a outer spool wall 5 and an inner spool wall 6. Machined in its inner circumferential surface the core 3 of the spool features a longitudinally oriented groove 7 configured bevelled at its end 8. At one end 9 (opening 9) the core 3 of the spool features a larger inner diameter than the opposite end 10. The inner circumference of the core 3 of the spool is configured stepped by three steps 11a-11c, the step 11a having the largest inner diameter and step 11c the smallest inner diameter. Machined in step 11a of the inner circumferential surface of the core 3 of the spool is a detent mount 12 extending ring-shaped over the full inner circumferential surface up to the groove 7.

The shaft 4 comprises the reel mechanical assembly 13 of the reel enclosed by a substantially roller-shaped housing 14. At one end 15 the housing 14 of the shaft 4 features a larger outer diameter than at the other end 16. The outer diameter of the housing 14 is stepped 17a-17c each with a diverse outer diameter. Due to the diverse inner circumferences of the zones 11a-11c of the core 3 of the spool and the diverse outer diameters of the housing 14 of the shaft 4 the shaft 4 can only be inserted into the end 9 of the core 3 of the spool by one end 16. When mated, the diverse inner diameters of the core 3 of the spool mate with the diverse outer diameters of the housing 14 so that the shaft 4 can be positively fitted in the core 3 of the spool.

Arranged at the housing 14 is a key element 18 protruding from the outer circumference of the housing 14. When the shaft 4 is inserted in the core 3 of the spool the key element 18 engages the groove 7 in the core 3 of the spool positively connecting the spool 2 to the shaft 4. It is this positive connection that retains the shaft 4 non-rotatable in the spool 2. The shaft 4 can only be inserted in the core 3 of the spool so that the key element 18 engages the groove 7, there being no other way of inserting the shaft 4 since the key element 18 protrudes from the outer circumference of the housing 14 of the shaft 4 and the inner diameter of the core 3 of the spool is also dimensioned in the region of the end 9 of the core 3 of the spool so that the key element 18 cannot be inserted into the core 3 of the spool in any other way.

The housing 14 of the shaft 4 comprises furthermore a resilient detent in the form of a ball 19 which is loaded in its guide 20 by a compression spring 21. The annular groove 12 in the core 3 of the spool serves to snap-mount the detent ball 19.

At one face 24 the shaft 4 is releasably connected by a screw 22 to a spool housing 23. Not shown is a reel foot connected to the spool housing 23 for securing to a fishing rod.

Likewise not shown is a handle at the end of the shaft 4 opposite the cited face 24.

The outer side of the inner spool wall 6 features a spacer ring 25 made of a plastics material and by means of which the spool 2 is limited in the direction of the rigid spool housing 23 when the pressure in the axial direction is excessive so that the detent 19 (three in all) always position the spool 2 as wanted axially. In other words, due to the spacer ring 25 the play of the spool in the structure as a whole is greatly restricted so that the detents 19 remain correctly snapped in place even with high pressure axially.

Disposed between the housing 14 and the reel mechanical assembly 13 is a bearing 26 so that the spool 2 can rotate on the reel mechanical assembly 13. Also included are two sealing rings 27 so that no water can find its way into the bearings whilst preventing grease weepage from the bearings.

All that is needed to disassemble the reel 1 or to change the spool 2 is to remove the screw 22 to separate the reel 1 from the spool housing 23. Then all that is required is to push the face 24 of the shaft 4 on the right-hand end 16 of the shaft 4 or to pull from the opposite side of the shaft 4 to release the detent between the balls 19 and the annular groove 12 and to remove the shaft 4 from the spool housing 2.

It is understood that instead of the configuration of the housing 14 of the shaft 4 as shown with a triple stepped outer diameter it is just as possible to engineer the housing 14 with a smaller outer diameter, a stabilizing ring then being formed roughly at the middle which has a larger outer diameter than that of the ring closing off the right-hand end 16 of the shaft 4. With this embodiment too, it is assured that the shaft 4 can be inserted from one side only into the spool 2.

What is claimed is:

1. A fishing reel comprising:
a spool having an annular hub part removably mounted on a shaft, said shaft being axially located in the hub part by at least one releasable detent connection, and said shaft being non-rotatably retained in the spool by at least one positive connection, said at least one releasable detent connection including at least one resilient pretensioned detent engaging at least one detent mount formed in an inner circumferential surface of the hub part, wherein said at least one detent mount snap locates said at least one pretensioned detent.

2. The fishing reel as set forth in claim 1, in which the at least one detent is a ball loaded in a guide by a compression spring.

3. The fishing reel as set forth in claim 1, in which said at least one detent mount is a groove.

4. The fishing reel as set forth in claim 1, in which said shaft comprises at least one slave element forming part of the at least one positive connection.

5. The fishing reel as set forth in claim 4, in which said at least one slave element is selected from the group consisting of a key, tang or pin engaging a depression, and a groove running in a longitudinal direction of the hub part in an inner circumferential surface of the hub part forming part of the at least one positive connection.

6. The fishing reel as set forth in claim 1, in which said hub part has at one end a larger inner diameter than at another end.

7. The fishing reel as set forth in claim 6, in which an inner circumference of the hub part is stepped.

8. The fishing reel as set forth in claim 1, in which said shaft comprises a housing accommodating a reel mechanical assembly on which male connecting parts for one of the detent connection and the positive connection with the spool are arranged.

9. The fishing reel as set forth in claim 1, in which said shaft comprises at least one stabilizing element.

10. The fishing reel as set forth in claim 9, in which said at least one stabilizing element is a stabilizing ring.

11. The fishing reel as set forth in claim 1, in which a handle is arranged at one end of the shaft.

12. The fishing reel as set forth in claim 1, in which said shaft is releasably connected to the spool.

13. The fishing reel as set forth in claim 1, in which said spool comprises a spacer ring at an outer side of a spool wall.

14. The fishing reel as set forth in claim 1, in which said shaft is screw-threaded at one end with a spool housing.

* * * * *